Patented Aug. 7, 1934

1,968,926

UNITED STATES PATENT OFFICE 1,968,926

VAT AND SULPHUR DYESTUFF PREPARATION

Hermann Berthold and Erwin Liese, Leverkusen-I. G. Werk, Germany, assignors to General Aniline Works, Inc., New York, N. Y., a corporation of Delaware No Drawing. Application August 14, 1933, Serial No. 685,148. In Germany August 26, 1932

10 Claims. (Cl. 8—6)

The present invention relates to a process of printing textile fibres with vat or sulphur dyestuffs and to new vat and sulphur dyestuff preparations suitable for textile printing.

In accordance with the invention vat and sulphur dyestuff preparations are produced comprising thionyldiglycol of the probable formula:—

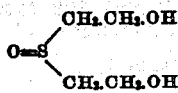

The new preparations are employed for the printing or slop-padding of animal-, vegetable or artificial fibres, such as cotton, viscose, wool, cellulose acetate silk and the like. They possess considerable advantages over the preparations hitherto known for said purpose.

Thus the new preparations ensure an improved fixing and stronger printings than the corresponding printing preparations without the addition of thionyldiglycol. Furthermore, fabrics printed with our new preparations can be stored for a prolonged time before the steaming process without any damage. Also, the finished printing colors containing thionyldiglycol are very stable. In consequence of these facts the printer is allowed to perform the single steps of printing (preparation of the printing paste, printing, steaming and developing of the printings) with any desired interruption as is generally not the case when printing with the printing colors hitherto known.

The thionyldiglycol may be added to the dry dyestuffs, whereby dry and easily workable dyestuff preparations are obtained. It may likewise be added to aqueous pastes of the vat or sulphur dyestuffs with or without the addition of other ingredients used in textile printing (glycerine, hydrotropic agents etc.) or to the printing pastes at any desired stage of their manufacture.

The extent of the effect attainable does not only depend on the nature of the dyestuff employed, but also on the method, by which the printing colors are produced from the dyestuff preparations and on the special methods of printing. The printing methods principally concerned can be divided into two groups:—

(1) Process of printing with previous reduction (known process), for example:—

40–200 grams of dyestuff (in paste) are pasted with 50 grams of glycerine, 315–350 grams of water, 25–50 grams of caustic soda solution (40° Bé.), 20–40 grams of calcined sodium carbonate and 500–450 grams of a thickening agent, containing in 1000 parts by weight:— .

| | Parts by weight |
|---|---|
| British gum | 280 |
| Starch | 100 |
| Sodium salt of benzylsulphanilic acid | 20 |
| Water | 600 | and at 70° C. 40–90 grams of sodium formaldehyde sulphoxylate and 10–40 grams of sodium hydrosulphite are added. With this printing color textile products are printed in the customary manner, the printings are steamed, for example, in a Mather-Platt apparatus and developed and finished in the customary manner.

When the above printing colors contain thionyldiglycol, there are obtained stronger printings and better fixation than without these materials.

The process of printing with previous reduction is generally used for dyestuffs, which vat with difficulty and when applying the dyestuffs in powder form. However, endeavours are made to replace this process even in the latter cases by process 2 (below)—

(2) Process of printing without previous reduction. The following is an example of the process:—

A printing color is made up from:—10–20 grams of dyestuff paste, 0–10 grams of water, 80 grams of a thickening agent, containing in 1000 parts by weight:—

| | Parts by weight |
|---|---|
| Tragacanth 65:1000 | 170 |
| Industrial gum 1:1 | 160 |
| Wheat starch | 60 |
| Water | 150 |
| British gum | 60 |
| Glycerine | 100 |
| Potassium carbonate | 150 |
| Sodium formaldehyde sulfoxylate | 150 |

Textile products printed with such printing colors are steamed in order to develop the dyestuff, then oxidized and finished in the customary manner.

When the above printing colors contain thionyldiglycol the printings in accordance with this process are usually stronger and fix better than without this addition. Consequently, it is possible to print by this latter process also such dyestuffs, which hitherto yielded satisfactory results only in the first process. This fact constitutes a considerable technical advance particularly in the avoidance of caustic alkalies, in consequence whereof the fibre is more cautiously treated, furthermore, in the prolonged stability and applicability of the made up printing pastes in consequence of the absence of the readily decomposable hydrosulphite, which is entirely replaced by sodium formaldehyde sulphoxylate.

It should be pointed out that these two main groups of printing methods are likely to be applied with success in most cases, however, modifications of these processes are also applicable.

As already outlined above the addition of thionyldiglycol can be carried out at any desired stage of the manufacture of the printing colors, for example:—

(a) The dyestuff in the form of a pressed cake containing water (12–40% dyestuff content), is stirred with an aqueous solution of thionyldiglycol, if desired, in the presence of glycerine or some other similar polyhydric water soluble alcohol. After milling and sieving of the mixture, uniform, smooth pastes are obtained, which do not dry up, do not form encrustations, do not deposit, do not freeze and, even after a prolonged period, can still be worked up to valuable printing colors, especially, when a preserving agent is added to the pastes.

(b) The dyestuff is finely ground and intimately mixed with the likewise finely ground thiodinylglycol. The addition of an emulsifying agent may be of advantage.

(c) The dyestuff in the form of a pressed cake containing water or in the form of an aqueous paste is evaporated to dryness in the presence of thionyldiglycol and, if desired, in the presence of dextrine or of an emulsifying agent.

(d) The dyestuff is reduced, advantageously by means of a hydrosulphite, in the presence of glycerine or another similar polyhydric alcohol, miscible with water, for example, thiodiglycol, thiodiglycerol or the like, with previous, simultaneous or subsequent addition of thionyldiglycol.

(e) The direct addition of thionyldiglycol to the printing color is likewise capable of considerably improving the printing qualities of the printing colors in question, for example:—

72 grams of a thickening containing in 1000 parts by weight:—

| | Parts by weight |
|---|---|
| Wheat starch | 60 |
| Water | 142 |
| British gum | 60 |
| Industrial gum 1:1 | 260 |
| Tragacanth 65:1000 | 170 |
| Potassium carbonate | 150 |
| Sodium formaldehyde sulphoxylate | 150 | are stirred to a printing color with an aqueous dyestuff paste and 8 grams of glycerine and 8 grams of thionyldiglycol.

In all the instances described under (a) to (e) dyestuff preparations are obtained, which either as such possess technical advantages (see, for example, the preparations under (a) or, as contrasted with the same preparations without the addition of the thionyldiglycol, display improved qualities of printing and fixation.

The amount of thionyldiglycol to be added may vary within the widest limits. Generally, we prefer to apply about 50 to about 100% by weight of the same (calculated on the dyestuff present) in order to get the best results, but substantially smaller or larger amounts are likewise operable.

If desired, additions known to favorably influence the printing of textiles with vat or sulphur dyestuffs, such as compounds of a hydrotropic character, can be made to the preparations, or also additions of anthraquinone or derivatives thereof, such as for example, hydroxyanthraquinones, aminoanthraquinones, anthraquinone sulphonic acids or carboxylic acids or also salts or such reduction products thereof as still contain oxygen in the meso-position. By these additions the printing qualities of the new preparations are in many instances still further improved.

It should be mentioned that, when using in the claims the expression "vat and sulphur dyestuff preparations for textile printing", it is intended to include all preparations specified under (a) to (e) and preparations similar thereto, which can find application for printing purposes and contain thionyldiglycol.

The printing methods, which can be used with advantage, have already been considered. The development of the printings can be carried out by the customary processes, for example, in the following manner:—

After drying the printed material, the same is subjected to the action of moist steam and the dyestuff is developed by means of potassium chromate/acetic acid (2 grams of $K_2Cr_2O_7$ and 5 ccs. of 30% acetic acid in 1 litre of water), followed by soaping at the boil.

The following examples illustrate the invention, without limiting it thereto:—

*Example 1*

A printing paste of one of the following dyestuffs:—N-dihydro-1.2.1'.2'-anthraquinone azine; the hydroxy-derivative of the dyestuff Colour Index No. 1109; 3.3'-dichloro-N-dihydro-1.2.1'.2'-anthraquinone azine; dibenzanthrone (Colour Index No. 1099), which has been prepared according to the method as described under (e), yields considerably better fixing and stronger printings than the corresponding printing pastes without the addition of thionyldiglycol. In case the steaming of the printed material is not immediately accomplished, but after some hours hanging, no considerable decline of the strength of the printings can be observed, that is, the stability of the printing color can also be observed on the printed material.

Valuable printing preparations may likewise be obtained by applying the methods described under (a) to (d) to the above named dyestuffs. The latter are especially suitable for the method of printing without previous reduction.

*Example 2*

The dyestuffs named in Example 1 may be replaced by the following dyestuffs:—6-methoxy-3-hydroxy-thionaphthene+4-methyl-6-bromo-2.3-dihydro-3-ketothionaphthene-2-(para-dimethylamino) anile, 6.6'-diethoxy-2.2'-bisthionaphtheneindigo, 6.6'-dichloro-4.4'-dimethyl-bis-thionaphtheneindigo, brominated anthanthrone, dichloroisoviolanthrone, the carbazole of 4.5'-dibenzoylamino-alpha-alpha-anthrimide.

Likewise, other dyestuffs of the indigoid and anthraquinoid series and also sulphur dyestuffs may be applied with advantage in the present process.

We claim:—

1. The process which comprises printing textile fibres with a printing paste comprising a vat or sulphur dyestuff and thionyldiglycol.

2. The process which comprises printing textile fibres with a printing paste comprising a vat or sulphur dyestuff and thionyldiglycol in an amount between about 50 and about 100% of the dyestuff applied.

3. The process which comprises printing textile fibres with a printing paste comprising 3.3'-dichloro-N-dihydro-1.2.1'.2'-anthraquinone azine and thionyldiglycol in an amount between about 50 and about 100% of the dyestuff applied.

4. The process which comprises printing textile fibres with a printing paste comprising dibenzanthrone and thionyldiglycol in an amount between about 50 and about 100% of the dyestuff applied.

5. The process which comprises printing textile fibres with a printing paste comprising 6.6'-diethoxy-2.2'-bisthionaphthene indigo and thionyldiglycol in an amount between about 50 and about 100% of the dyestuff applied.

6. A vat of sulphur dyestuff preparation for textile printing comprising thionyldiglycol.

7. A vat or sulphur dyestuff preparation comprising thionyldiglycol in an amount between about 50 and about 100% of the dyestuff present.

8. A vat dyestuff preparation comprising 3.3'-dichloro-N-dihydro-1.2.1'.2'-anthraquinone azine and thionyldiglycol in an amount between about 50 and about 100% of the dyestuff present.

9. A vat dyestuff preparation comprising dibenzanthrone and thionyldiglycol in an amount between about 50 and about 100% of the dyestuff present.

10. A vat dyestuff preparation comprising 6.6'-diethoxy-2.2'-bisthionaphthene indigo and thionyldiglycol in an amount between about 50 and about 100% of the dyestuff present.

HERMANN BERTHOLD.
ERWIN LIESE.